(12) United States Patent
Landa et al.

(10) Patent No.: US 6,716,780 B2
(45) Date of Patent: *Apr. 6, 2004

(54) GREY GLASS COMPOSITION INCLUDING ERBIUM, HOLMIUM, AND/OR YTTRIUM

(75) Inventors: Ksenia A. Landa, Grosse Ile, MI (US); Leonid Landa, Grosse Ile, MI (US); Anthony V. Longobardo, Howell, MI (US); Scott V. Thomsen, Milford, MI (US); David R. Hall, Jr., Detroit, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 204 days.

This patent is subject to a terminal disclaimer.

(21) Appl. No.: 09/962,843

(22) Filed: Sep. 26, 2001

(65) Prior Publication Data

US 2003/0114290 A1 Jun. 19, 2003

(51) Int. Cl.$^7$ .................. C03C 3/095; C03C 3/087
(52) U.S. Cl. ............... 501/64; 501/70; 501/71; 501/78
(58) Field of Search ............... 501/50, 64, 78, 501/70, 71, 904, 905

(56) References Cited

U.S. PATENT DOCUMENTS

| | | |
|---|---|---|
| 2,309,070 A | 1/1943 | Austin et al. |
| 2,382,282 A | 8/1945 | Austin et al. |
| 2,414,413 A | 1/1947 | Pavlish et al. |
| 2,524,719 A | 10/1950 | Tillyer |
| 3,024,121 A | 3/1962 | Hagedorn |
| 3,121,628 A | 2/1964 | Loehrke |
| 3,628,932 A | 12/1971 | Inoue |
| 3,663,474 A | 5/1972 | Lee et al. |
| 3,941,605 A | 3/1976 | Yamashita |
| 4,101,705 A | 7/1978 | Fischer et al. |
| 4,999,321 A | 3/1991 | Kohli |
| 5,036,025 A | 7/1991 | Lin |
| 5,190,896 A | 3/1993 | Pucilowski et al. |
| 5,214,008 A | 5/1993 | Beckwith et al. |
| 5,264,400 A | 11/1993 | Nakaguchi et al. |
| 5,318,931 A | 6/1994 | Nakaguchi et al. |
| 5,364,820 A | 11/1994 | Morimoto et al. |
| 5,413,971 A | 5/1995 | McPherson |
| 5,446,007 A | 8/1995 | Krashkevich et al. |
| 5,545,596 A | 8/1996 | Alvarez Casariego et al. |
| 5,569,630 A | 10/1996 | Landa et al. |
| 5,952,255 A | 9/1999 | Seto et al. |
| 5,958,811 A | 9/1999 | Sakaguchi et al. |
| 5,998,316 A | 12/1999 | Seto et al. |
| 6,110,583 A | 8/2000 | Varanasi et al. |
| 6,114,264 A | 9/2000 | Krumwiede et al. |
| 6,136,736 A | 10/2000 | Rajaram et al. |
| 6,235,666 B1 | 5/2001 | Cochran et al. |
| 6,376,403 B1 | 4/2002 | Koyama et al. |
| 6,420,288 B2 * | 7/2002 | Schweiger et al. ........... 501/7 |
| 6,498,118 B1 * | 12/2002 | Landa et al. .................. 501/64 |
| 2001/0006927 A1 | 7/2001 | Cochran et al. |
| 2002/0049128 A1 | 4/2002 | Koyama et al. |
| 2002/0058579 A1 | 5/2002 | Seto et al. |

FOREIGN PATENT DOCUMENTS

| | | |
|---|---|---|
| EP | 0 538 941 | 4/1993 |
| EP | 0 825 156 A1 | 2/1998 |
| EP | 0 738 243 B1 | 9/1998 |
| EP | 1 041 050 A1 | 10/2000 |
| EP | 0 816 296 B1 | 2/2001 |
| EP | 0 653 386 B2 | 5/2001 |
| EP | 1 201 615 | 5/2002 |
| JP | 4 280834 | 10/1992 |
| WO | WO 01/17920 | 3/2001 |

OTHER PUBLICATIONS

U.S. patent application (copy enclosed) S.N. 09/891,305, filed Jun. 27, 2001.

* cited by examiner

*Primary Examiner*—David Sample
*Assistant Examiner*—Elizabeth A. Bolden
(74) *Attorney, Agent, or Firm*—Nixon & Venderhye P.C.

(57) ABSTRACT

A glass composition including from 0.10 to 2.0% yttrium oxide (e.g., $Y_2O_3$) and employing in its colorant portion iron (total iron expressed as $Fe_2O_3$), erbium (e.g., $Er_2O_3$), and/or holmium (e.g., $Ho_2O_3$). In certain embodiments, the glass may be grey in color.

30 Claims, No Drawings

GREY GLASS COMPOSITION INCLUDING ERBIUM, HOLMIUM, AND/OR YTTRIUM

This invention relates to glass compositions and methods of making the same. More particularly, this invention relates to glass compositions including at least erbium (Er) and holmium (Ho), which have low light transmittance in the UV (ultraviolet) and IR (infrared) ranges and high light transmittance in the visible range. Such glass compositions are useful, for example, in windows and windshields in the automotive industry and also in architectural applications. Glasses herein may be grey, or otherwise colored.

BACKGROUND OF THE INVENTION

The automotive industry, for a number of years, has desired glass having grey color (sometimes called "neutral grey") for automotive window applications. At the same time, it is also desirable for transmission in the UV and/or IR ranges of the light spectrum to be minimized. Moreover, certain Governmental regulations in the automotive industry have been known to require that visible light transmittance be at least 70% in certain vehicular windows when provided by the original equipment manufacturer of the vehicle (e.g. GM, Ford, Chrysler etc.) in the U.S.A. Accordingly, there exists a need in the automotive industry for a glass which achieves these properties (a similar need may also exist in other industries such as the architectural glass industry).

A glass window or other glass article is said to have the desirable color "grey" when it has a dominant wavelength of from 435 nm to 570 nm (this dominant wavelength range defines the color "grey" herein). Moreover, grey glass often has an excitation purity of less than about 4.5%. In certain embodiments, it may be preferable to have a dominant wavelength of from 470 nm to 570 nm, or even from 480–560 nm, with purity of from about 0.2 to 4.5%.

While glass having "grey" color is often desirable, there sometimes also exists a need or desire to achieve certain levels of light transmission defined conventionally by:

Lta as visible light transmission,
UV as ultraviolet light transmission, and
IR as infrared light transmission.

Glass thickness ranges of from about 1–6 mm, more preferably from about 3–4 mm, are typically used when measuring the aforesaid characteristics. These thickness ranges are generally recognized as conventional thicknesses for glass sheets made by the float glass process, as well as recognized thickness ranges in the automotive industry.

For automotive windows (including windshields) it is often desirable for glass to have one or more of the following characteristics at any or all of the aforesaid thicknesses:

Lta: at least about 70%
UV: no greater than about 52%, more preferably no greater than 50%
IR: no greater than about 46%, more preferably no greater than 42%

Classically formulated grey glasses often include low levels of iron (i.e., less than 0.2% total iron) along with cobalt and nickel oxides. Unfortunately, while this type of glass may achieve satisfactory coloration in certain instances, it typically suffers from undesirable solar characteristics. Certain nickel-free grey glasses combine selenium (Se) and cobalt (Co) oxide with iron oxide, but also suffer from poor solar performance characteristics.

Certain known green solar control float glasses are formulated so as to achieve desirable solar characteristics due in large part to their use of large quantities of total iron (e.g., 0.60 to 0.84% total iron). Unfortunately, the green coloration of such glasses does not always harmonize well with certain exterior automotive paints and sometimes affects vehicle interiors when viewed through the glass.

In view of the above, it is apparent that there exists a need in the art for a new glass composition which overcomes the above problems while achieving one or more of desired grey color and desired solar management property(ies) of the particular application in which it is to be used.

SUMMARY OF THE INVENTION

An object of this invention is to provide a grey glass (i.e., having a dominant wavelength of from 435 nm to 570 nm) including a colorant portion which may include at least from 0.20 to 2.50%, by weight, erbium oxide (e.g., $Er_2O_3$), from about 0.10 to 0.90%, by weight total iron (expressed as $Fe_2O_3$); and from about 0.05 to 1.60%, by weight, holmium oxide (e.g., $Ho_2O_3$); and from about 0.10 to 2.0%, by weight, yttrium oxide (e.g., $Y_2O_3$). The combination of erbium oxide, iron oxide, holmium oxide, and yttrium oxide provides for desirable color and/or solar characteristics in different embodiments of this invention.

In certain example embodiments of this invention, one or more of the above listed needs and/or objects is/are fulfilled by providing a glass comprising:

| Ingredient | wt. % |
| --- | --- |
| yttrium oxide: | 0.10–2.0% |
| total iron: | 0.10–2.0% |
| erbium oxide: | 0.20–2.50% |
| holmium oxide: | 0.05–1.60%. |

In other example embodiments of this invention, one or more of the above-listed objects and/or needs is fulfilled by providing a grey glass comprising:

a base glass portion comprising:

| Ingredient | wt. % |
| --- | --- |
| $Y_2O_3$ | 0.10–2.0% |
| $SiO_2$ | 67–75% |
| $Na_2O$ | 10–20% |
| CaO | 5–15% |
| MgO | 0–5% |
| $Al_2O_3$ | 0–5% |
| $K_2O$ | 0–5% |
| BaO | 0–1% | and a colorant portion consisting essentially of:

| Ingredient | wt. % |
| --- | --- |
| total iron: | 0.10–0.90% |
| erbium oxide: | 0.20–2.50% |
| selenium: | 0.0–2.0% |
| cobalt oxide: | 0.0–0.0050% |
| titanium oxide: | 0.0–2.0% |
| boron oxide: | 0.0–2.0% |
| holmium oxide: | 0.05–1.60% |
| thulium oxide: | 0.0–2.0% |

-continued

| Ingredient | wt. % |
|---|---|
| ytterbium oxide: | 0.0–3.0% |
| lutetium oxide: | 0.0–1.0% | wherein the grey glass has a dominant wavelength in the range of from 435 nm to 570 nm.

In certain embodiments, the glass may be grey in color and have an excitation purity (Pe) of no greater than about 4.5%.

In certain exemplary embodiments, the glass or glass composition is substantially free of cerium and/or nickel.

While grey color is preferred in certain embodiments, this invention is not so limited. Colorant portions herein may be used in conjunction with other glass colors in alternative embodiments of this invention.

DETAILED DESCRIPTION OF CERTAIN EMBODIMENTS OF THIS INVENTION

Glasses according to different embodiments of this invention may be used, for example, in the automotive industry (e.g., windshields, backlites, side windows, etc.), in architectural applications, and in other suitable applications. Such glasses may be grey, or otherwise colored in different embodiments of this invention.

Certain glasses according to this invention utilize soda-lime-silica flat glass as their base composition/glass, to which is added certain ingredients making up a unique colorant portion. An exemplary soda-lime-silica base glass according to certain embodiments of this invention, on a weight percentage basis, includes the following basic ingredients:

TABLE 1

Exemplary Base Glass

| Ingredient | Wt. % |
|---|---|
| $SiO_2$ | 67–75% |
| $Na_2O$ | 10–20% |
| CaO | 5–15% |
| MgO | 0–5% |
| $Al_2O_3$ | 0–5% |
| $K_2O$ | 0–5% |
| BaO | 0–1% |
| $Y_2O_3$ | 0.10–2.0% |

It is noted that in certain preferred embodiments of this invention, the Yttrium oxide ($Y_2O_3$) is added to the base glass along with the colorants. However, because $Y_2O_3$ is knows to be essentially colorless in glass, it is listed and considered herein as part of the base glass as opposed to the colorant portion. In certain preferred embodiments of this invention, the glass composition (before and after the melt) includes from about 0.10 to 2.0% $Y_2O_3$, more preferably from about 0.10 to 1.0% $Y_2O_3$, and even more preferably from about 0.10 to 0.6% $Y_2O_3$.

Other minor ingredients, including various conventional and refining aids, such as $SO_3$, carbon, gypsum, $CaSO_4$ and the like may also be included in the base glass. In certain embodiments, for example, glass herein may be made from batch raw materials silica sand, soda ash (or NaOH as a soda source), dolomite, limestone, with the use of salt cake ($SO_3$) and/or Epsom salts (e.g., about a 1:1 combination of both) as refining agents. Reducing agent(s) such as Si (metallic), Si, silicon monoxide, SiO, sucrose, and/or carbon may also be used. Preferably, soda-lime-silica base glasses herein include by weight from about 10–15% $Na_2O$ and from about 6–12% CaO. While a soda-lime-silica base glass set forth above is preferred in certain embodiments of this invention, this invention is not so limited. Thus, other base glasses (e.g., borosilicate glass) may instead be employed in alternative embodiments.

To the base glass (e.g., see Table 1 above), the instant invention adds a colorant portion which may cause the resulting glass to be grey in color (e.g., dominant wavelength of from 435 nm to 570 nm) and/or achieve desirable solar management properties (e.g., low UV and IR transmission coupled with high visible transmission). In certain preferred embodiments, the resulting glass is grey in color and has a dominant wavelength of from 480 nm–560 nm (nanometers). Moreover, the resulting glass preferably has an excitation purity (Pe) no greater than about 4.5%, and most preferably from 0.2% to 4.5%.

In certain embodiments of this invention, an exemplary colorant portion that is added to the base glass is substantially free of cerium and nickel (i.e., no more than 0.0030% Ce, CeO, and/or $CeO_2$, and no more than 0.0010% Ni and/or NiO), and is characterized in final glasses as set forth in Table 2 below (in terms of weight percentage of the total glass composition):

TABLE 2

Exemplary Colorant Portion

| Ingredient | General wt. % | More Preferred wt. % |
|---|---|---|
| total iron (expressed as $Fe_2O_3$): | 0.10–0.90% | 0.20–0.70% |
| erbium oxide (e.g., $Er_2O_3$): | 0.20–2.50% | 0.30–2.1% |
| selenium (Se): | 0.0–2.0% | 0.0002–0.0050% |
| cobalt oxide (e.g., $Co_3O_4$): | 0.0–0.0050% | 0.0005–0.0030% |
| titanium oxide (e.g., $TiO_2$): | 0.0–2.0% | 0.01 to 0.5% |
| boron oxide (e.g., $B_2O_3$): | 0.0–2.0% | 0.0–1.0% |
| holmium oxide (e.g., $Ho_2O_3$): | 0.05–1.60% | 0.10–0.60% |
| thulium oxide (e.g., $Tm_2O_3$): | 0.0–2.0% | 0.0–1.0% |
| ytterbium oxide (e.g., $Yb_2O_3$): | 0.0–3.0% | 0.0–2.0% |
| lutetium oxide (e.g., $Lu_2O_3$): | 0.0–1.0% | 0.0–0.80% |

It should be appreciated that small amounts of other materials (e.g., refining aids, melting aids, and/or impurities) may be present in the glass such as chromium, manganese, molybdenum, tin, chlorine, zinc, zirconium, Si, sulfate, fluorine, lithium and strontium, without taking away from the purpose(s) and/or goal(s) of the instant invention. It is also noted that up to about 2.0% total iron may be used in certain embodiments of this invention.

The total amount of iron present in the glass and in the colorant portion thereof is expressed herein in terms of $Fe_2O_3$ in accordance with standard practice. This, however, does not imply that all iron is actually in the from of $Fe_2O_3$. Likewise, the amount of iron in the ferrous state is reported herein as FeO, even though all ferrous state iron in the glass may not be in the form of FeO. The proportion of the total iron in the ferrous state (i.e., FeO) is used to determine the redox state of the glass, and is expressed as the ratio $FeO/Fe_2O_3$, which is the weight percentage (%) of iron in the ferrous state (expressed as FeO) divided by the weight percentage (%) of total iron (expressed as $Fe_2O_3$). Thus, $Fe_2O_3$ herein means total iron and FeO means iron in the ferrous state. According to certain embodiments of this invention, the colorant portion of the glass composition herein is characterized by a redox value (i.e., $FeO/Fe_2O_3$) of from 0.10 to 0.25, more preferably from 0.12 to 0.20.

Moreover, it is noted that glass according to this invention is often made via the known float process in which a tin bath is utilized. It will thus be appreciated by those skilled in the art that as a result of forming the glass on molten tin in certain exemplary embodiments, small amounts of tin or tin oxide may migrate into surface areas of the glass on the side that was in contact with the tin bath during manufacture (i.e., typically, float glass may have a tin oxide concentration of 0.05% or more (wt.) in the first few microns below the surface that was in contact with the tin bath).

Glasses of this invention, as stated above, may in certain non-limiting embodiments achieve a true grey or neutral grey color. Such a true "grey" color is best s defined, as aforesaid, by referring to: (1) "dominant wavelength", and/or (2) "excitation purity." Other colors are also possible in other embodiments of this invention. In certain embodiments, glasses herein include one or more of the following color/solar characteristics when measured at a nominal thickness of from about 1 mm–6 mm (and preferably for most uses, at about 3 mm–4 mm):

TABLE 3

Exemplary Transmissive Color/Solar Characteristics

| Characteristic | General | More Preferred |
| --- | --- | --- |
| L* (Ill. D65, 10 deg. observer): | 85–96 | 86–94 |
| a* (Ill. D65, 10 deg. observer): | −5.0 to +4.0 | −4.0 to +2.0 |
| b* (Ill. D65, 10 deg. observer): | −4.0 to +3.0 | −2.0 to +2.5 |
| Lta (visible transmittance): | >=65% | >=70% |
| $IR_{transmission}$: | <=46% | <=42% |
| UV%: | <=52% | <=50% |

When used in the automotive market for windows and/or windshields that must conform to certain minimal visible light transmission properties, certain example glass articles of this invention (e.g., at 3 mm thicknesses for purposes of reference) preferably have an Lta of at least 65%, more preferably of at least about 70% and, in certain embodiments of least about 72%, and in still further instances at least about 75%; and/or an IR transmission percentage (%) of no greater than 46%. Additionally, in certain exemplary embodiments, glasses herein have a UV transmission percentage (%) of no greater than about 52%, more preferably no greater than about 50%, and sometimes no greater than 46%. These optical characteristics relate to example embodiments only, and are not limiting upon the invention as a whole unless specifically claimed herein.

The glasses of this invention achieve the above unique characteristics (i.e., desired color in combination with desired solar management properties, e.g., Lta, UV, IR) in base glasses (e.g., silicate glasses such as soda-lime-silica, or borosilicate glasses) through the use of the unique colorant portions discussed herein. Erbium acts as a pink colorant, holmium as a pale yellow colorant, and the FeO aspect of the total iron acts as a blue colorant. As discussed above, selenium and cobalt may be utilized in the colorant portion for coloration purposes to achieve the desired grey color.

With regard to Se, in certain embodiments Se may be introduced into the glass batch in amounts of, for example, from 5–20 ppm. In order to increase retention of Se and to improve homogeneity of the glass through a more uniform Se distribution in the melt, compositions of this invention may use various sources of Se, such as sodium and/or calcium selenites, iron and/or cobalt selenides, and/or metallic Se powder. Moreover, while Se often combines with iron as iron selenide (FeSe) in glass to produce brown color, and does so in certain embodiments of this invention, selenium is referred to in the colorant portion herein as "Se" which is meant to include, for example, its state as Se as well as other states in glass such as FeSe. While the use of Se is preferred in the colorant portion as discussed above, it is noted that in some embodiments Se need not be present.

Regarding cobalt (Co), this blue colorant may be added to the glass batch in amounts of, for example, 10–30 ppm. Moreover, it is believed that much of the cobalt in the glass is in the oxide state of $Co_3O_4$. However, other oxide states of CoO are also possible in glasses according to this invention. Thus, unless expressly stated to the contrary, the terms cobalt oxide, CoO and $Co_3O_4$ as used herein include not only cobalt in this/these particular oxide state(s), but also include(s) cobalt which may be present in other oxide state(s).

Holmium oxide acts as a pale yellow colorant. Moreover, it is believed that much of the holmium in the glass is in the oxide state of $Ho_2O_3$. However, other oxide states of HoO are also possible in glasses according to this invention. Thus, unless expressly stated to the contrary, the terms holmium oxide, HoO and $Ho_2O_3$ as used herein include not only holmium in this/these particular oxide state(s), but also include(s) holmium which may be present in other oxide state(s). Also, with regard to Er, unless expressly stated to the contrary, the terms erbium oxide, ErO and $Er_2O_3$ as used herein include not only Er in this/these particular oxide state(s), but also include(s) Er which may be present in other oxide state(s). The same is true of other oxides herein, including but not limited to yttrium oxide.

Colorant elements Ho, Er, Tm, Yb and Lu are all lanthanides or rare earth elements. Thus, as can be seen herein, in certain preferred embodiments a plurality of different lanthanides (or rare earth elements) are used in the glass composition together with iron in order to achieve the desired glass color. This is advantageous in that lanthanides are often grouped together when mined, and thus the ability to use multiple lanthanides together as a colorant portion is more cost efficient than previous methods of adding colorants such as Er. For example and without limitation, a three element concentrate including oxides of Er, Ho and Y may be added to the base glass in order to color the same as will be explained in the examples below (regardless of when Y is added to the glass composition, whether or not along with Er and Ho, it is considered part of the base glass because it is essentially colorless and does not act as a colorant herein). In other embodiments, a different plurality of rare earth oxides may be added to the base glass. In some embodiments of this invention three or more lanthanides combine with at least iron in order to achieve the desired glass color and/or solar characteristics.

For purposes of example only, and without limitation, a three element Er inclusive concentrate available from Tianjio International Trading Co. (U.S.A.), Inc., Burlingame, Calif. (e.g., Y—Ho—Er oxide concentrate), may be used to add the aforesaid lanthanides. This particular concentrate includes, by weight percentage, about 17.27% $Y_2O_3$, about 68.29% $Er_2O_3$, and about 13.63% $Ho_2O_3$ (as well as trace amounts of other elements). Accordingly, in certain preferred embodiments the composition includes at least three times as much $Er_2O_3$ as $Y_2O_3$. In other embodiments of this invention, two, three or four different lanthanides may be used together with iron to achieve the desired glass color and/or solar characteristics. In certain embodiments of this invention, the wt. % of all lanthanides or rare earth elements (including the lanthanide oxides listed above) in the glass composition put together is from 0.8 to 5.0%, more preferably from 1.0 to 3.0%. In certain preferred embodiments, glass compositions herein have more erbium oxide ($Er_2O_3$) than any of holmium oxide ($Ho_2O_3$), yttrium oxide ($Y_2O_3$), ytterbium oxide, or lutetium oxide taken individually. In certain preferred embodiments, glass compositions herein have at least twice as much erbium oxide ($Er_2O_3$) as holmium oxide ($Ho_2O_3$). In certain preferred embodiments, glass compositions herein have at least twice as much erbium oxide ($Er_2O_3$) as yttrium oxide ($Y_2O_3$).

EXAMPLES

The glasses of this invention may be made from batch ingredients using well known glass melting and refining techniques once given the above final glass analysis. For example, in a conventional batch technique for melting, the following base glass batch was used for the Examples herein (note: the below-listed ingredients in the batch will add up to 100% by weight once oxides thereof are accounted for; thus, they need not add up to one hundred as raw materials):

TABLE 4

Base Glass for Examples 1–6

| Batch Ingredient for Base Glass | Parts by Wt. |
| --- | --- |
| sand | 71.5 |
| soda ash | 23.7 |
| dolomite | 18.32 |
| limestone | 6.1 |
| Epsom salt | 0.9 |
| Sucrose | 0.3 |

In addition to the base glass materials above, the colorant portions for Examples 1–6 herein of different embodiments of this invention were as follows (wt. % of total glass) in amounts added to the base batch. It is noted that $Y_2O_3$ is not a colorant, and is listed in Table 5 below along with the colorant for purposes of simplicity only because it was added to the glass batch therewith as part of the aforesaid three element concentrate.

TABLE 5

Colorant Portions for Examples 1–6 (except $Y_2O_3$ not a colorant)

| Compound/Element | Ex. 1 | Ex. 2 | Ex. 3 | Ex. 4 | Ex. 5 | Ex. 6 |
| --- | --- | --- | --- | --- | --- | --- |
| total iron ($Fe_2O_3$): | 0.45 | 0.45 | 0.45 | 0.45 | 0.65 | 0.45 |
| erbium oxide (e.g., $Er_2O_3$): | 0.683 | 1.21 | 1.23 | 0.683 | 2.01 | 0 |
| Se as $Na_2SeO_3$: | 0.003 | 0.002 | 0.0022 | 0.0025 | 0.0 | 0 |
| cobalt oxide ($Co_3O_4$): | 0.002 | 0.002 | 0.0029 | 0.0029 | 0.0015 | 0 |
| holmium oxide ($Ho_2O_3$): | 0.137 | 0.243 | 0.25 | 0.137 | 0.40 | 0 |
| yttrium oxide ($Y_2O_3$): | 0.17 | 0.301 | 0.31 | 0.17 | 0.50 | 0.5 |

It is noted that much of the Se added to the batch as $Na_2SeO_3$ burned/burns off during the melt (so that a much smaller amount of Se is in the glass composition of the final glass product). The remaining elements in Table 5 above are believed to have substantially remained in the final glasses of Examples 1–6. It is noted that Example 6 is provided for comparison purposes, to illustrate the undesirable color associated with glass composition if the Er and/or Ho is not present in the composition (see extreme a* value below).

Solar characteristics for Examples 1–6 were as follows, where Lta, a*, b*, and L* were transmissive (a*, b* and L* data were taken via Ill. D65, 10 deg. observer), where TS stands for total solar, and each glass sample was about 3 mm thick:

TABLE 6

Solar Characteristics of Examples 1–6

|  | Ex. 1 | Ex. 2 | Ex. 3 | Ex. 4 | Ex. 5 | Ex. 6 |
| --- | --- | --- | --- | --- | --- | --- |
| Thickness (mm): | 3 | 3 | 3 | 3 | 3 | 3 |
| % Lta: | 70.9 | 71.0 | 68.89 | 70.99 | 70.72 | 78.74 |
| % UV: | 48.85 | 51.37 | 49.79 | 52.38 | 44.75 | 54.82 |
| % IR: | 45.45 | 40.61 | 40.85 | 42.37 | 34.36 | 33.03 |
| % (TS) | 57.13 | 54.7 | 54.01 | 56.04 | 50.67 | 54.36 |
| a* | −0.9 | −0.35 | −0.5 | −2.0 | −1.2 | −6.2 |
| b* | 1.2 | −0.03 | −0.97 | −1.63 | −0.6 | −1.1 |
| L* | 87.46 | 87.55 | 86.61 | 87.87 | 87.59 | 91.99 |

In manufacturing the glasses of Examples 1–6 above, the base glass batch material together with the colorant portion was melted. Thereafter, it was annealed at about 620 degrees C. for half an hour, and then allowed to cool down to room temperature. The example glasses (i.e., samples) were then polished to the desired thickness and spectral measurements above were taken to determine the light transmittance in the wavelength range from 250 to 2,000 nm. The results are set forth in the tables above. Also, each of Examples 1–5 was grey in color and had a dominant wavelength of from 480 nm–560 nm (nanometers), and an excitation purity (Pe) from 0.2% to 4.5%.

It is noted that luminous transmittance (Lta) (2 degree observer) is understood in the art, and is used herein in accordance with its known meaning, e.g., see U.S. Pat. No. 5,308,805 (e.g., see ASTM E308). This term is also known as Ill. A visible transmittance (380–780 nanometers inclusive), and its measurements are made in accordance with CIE Publication 15.2 (1986)) and ASTM E308. The terms, and characteristics, of ultraviolet light transmittance (% UV), infrared energy transmittance (% IR), dominant wavelength (DW) and excitation purity (i.e. % "purity", or Pe) are also well understood terms in the art, as are their measurement techniques. Such terms are used herein, in accordance with well known meaning, e.g., see U.S. Pat. No. 5,308,805. In particular, ultraviolet transmittance (% UV) is measured herein using Parry Moon Air Mass=2 (300–400 nm inclusive, integrated using Simpson's Rule at 10 nm intervals). IR transmittance is conventionally measured using Simpson's Rule and Parry Moon Air Mass=2 over the wavelength range 800–2100 nm inclusive at 50 nm intervals. Dominant wavelength (DW) is calculated and measured conventionally in accord with the aforesaid CIE Publication 15.2 (1986) and ASTM: E 308–90. The term "dominant wavelength" includes both the actual measured wavelength and, where applicable, its calculated complement. Excitation purity (Pe or % "purity") is measured conventionally in accordance with CIE Publication 15.2 (1986) and ASTM: E 308–90.

It is noted that according to different embodiments of this invention, glass compositions herein may be manufactured via single batch melting techniques, or alternatively via multiple pre-batch mixing techniques utilizing separate pre-batch mixes that are ultimately mixed together to make up a final overall batch mixture. For example, in the latter approach, one of the prebatch mixes could be made up of the iron-containing ingredient (e.g. rouge) along with SiO (silicon monoxide) and optionally, metallic Si (i.e. the reducing agents), and preferably some of the sand. The remaining batch ingredients can then be made up by admixing them in another separate prebatch mix or into two or more prebatch mixes before admixing them with the iron and reducing agent-containing first prebatch mix. After each separate prebatch mix is separately mixed, to form a substantially homogenous powdered admixture, the two or more prebatch mixes are mixed together to form the overall (or final) batch mixture. Conventional melting and refining techniques are then used to form a molten glass from which flat sheet glass or other articles may be formed.

Once given the above disclosure many other features, modifications and improvements will become apparent to the skilled artisan. Such features, modifications and improvements are therefore considered to be a part of this invention, the scope of which is to be determined by the following claims:

What is claimed is:

1. A grey glass comprising:

a base glass portion comprising:

| Ingredient | wt. % |
|---|---|
| $Y_2O_3$ | 0.10–2.0% |
| $SiO_2$ | 67–75% |
| $Na_2O$ | 10–20% |
| CaO | 5–15% |
| MgO | 0–5% |
| $Al_2O_3$ | 0–5% |
| $K_2O$ | 0–5% |
| BaO | 0–1% | and a colorant portion consisting essentially of:

| Ingredient | wt. % |
|---|---|
| total iron: | 0.10–0.90% |
| erbium oxide: | 0.20–2.50% |
| selenium: | 0.0–2.0% |
| cobalt oxide: | 0.0–0.0050% |
| titanium oxide: | 0.0–2.0% |
| boron oxide: | 0.0–2.0% |
| holmium oxide: | 0.05–1.60% |
| thulium oxide: | 0.0–2.0% |
| ytterbium oxide: | 0.0–3.0% |
| lutetium oxide: | 0.0–1.0% | wherein the grey glass has a dominant wavelength in the range of from 435 nm to 570 nm.

2. The glass of claim 1, wherein the glass has an excitation purity (Pe) of no greater than about 4.5%, and wherein the glass comprises at least three times as much erbium oxide as $Y_2O_3$.

3. The glass of claim 2, wherein said dominant wavelength and excitation purity are measured at a nominal thickness of the glass of anywhere from about 3 mm to 4 mm.

4. The glass of claim 1, wherein the glass is substantially free of cerium.

5. The glass of claim 4, wherein the glass is substantially free of nickel.

6. The glass of claim 1, further comprising a redox value $FeO/Fe_2O_3$ of from 0.10 to 0.25.

7. The glass of claim 1, wherein the colorant portion consists essentially of:

| Ingredient | wt. % |
|---|---|
| total iron: | 0.20–0.70% |
| erbium oxide: | 0.30–2.1 % |
| selenium: | 0.0002–0.0050% |
| cobalt oxide: | 0.0005–0.0030% |
| titanium oxide: | 0.0–0.5% |
| boron oxide: | 0.0–1.0% |
| holmium oxide: | 0.10–0.60% |
| thulium oxide: | 0.0–1.0% |
| ytterbium oxide: | 0.0–2.0% |
| lutetium oxide: | 0.0–0.80%. |

8. The glass of claim 1, wherein the glass has a visible transmission Lta of at least about 70%.

9. The glass of claim 8, wherein the glass has an IR transmission of no greater than about 46%.

10. The glass of claim 1, wherein the colorant portion includes at least twice as much erbium oxide as holmium oxide.

11. The glass of claim 10, wherein the composition includes from about 0.10 to 1.0% $Y_2O_3$.

12. The glass of claim 1, wherein the glass has a transmissive color characterized as follows:

| | |
|---|---|
| a* | from −4.0 to +2.0 |
| b* | from −2.0 to +2.5. |

13. A glass comprising:

a base glass portion comprising:

| Ingredient | wt. % |
|---|---|
| $Y_2O_3$ | 0.10–2.0% |
| $SiO_2$ | 67–75% |
| $Na_2O$ | 10–20% |
| CaO | 5–15% |
| MgO | 0–5% |
| $Al_2O_3$ | 0–5% |
| $K_2O$ | 0–5% |
| BaO | 0–1% | and a colorant portion comprising:

| Ingredient | wt. % |
|---|---|
| total iron: | 0.10–0.90% |
| erbium oxide: | 0.20–2.50% |
| selenium: | 0.0–2.0% |
| cobalt oxide: | 0.0–0.005% |
| titanium oxide: | 0.0–2.0% |
| boron oxide: | 0.0–2.0% |
| holmium oxide: | 0.05–1.60% |
| thulium oxide: | 0.0–2.0% |
| ytterbium oxide: | 0.0–3.0% |
| lutetium oxide: | 0.0–1.0%. |

14. The glass of claim 13, wherein the glass is grey in color and has an excitation purity (Pe) of no greater than about 4.5%, and a dominant wavelength in the range of from 435 nm to 570 nm.

15. The glass of claim 14, wherein the dominant wavelength and excitation purity are measured at a nominal thickness of the glass of anywhere from 3 mm to 4 mm.

16. The glass of claim 13, wherein the glass is substantially free of cerium.

17. The glass of claim 13, wherein the glass is substantially free of nickel.

18. The glass of claim 13, wherein the glass composition comprises from about 0.10 to 0.60% $Y_2O_3$, and the colorant portion comprises:

| Ingredient | wt. % |
|---|---|
| total iron: | 0.20–0.70% |
| erbium oxide: | 0.30–2.1% |
| selenium: | 0.0002–0.0050% |
| cobalt oxide: | 0.0005–0.0030% |
| titanium oxide: | 0.0–0.5% |
| boron oxide: | 0.0–1.0% |
| holmium oxide: | 0.10–0.60% |
| thulium oxide: | 0.0–1.0% |
| ytterbium oxide: | 0.0–2.0% |
| lutetium oxide: | 0.0–0.80%. |

19. The glass of claim 13, wherein the glass has a visible transmission Lta of at least about 65%.

20. The glass of claim 19, wherein the glass has an IR transmission of no greater than about 46% and a UV transmission of no greater than about 52%.

21. The glass of claim 13, wherein the colorant portion includes at least twice as much erbium oxide as holmium oxide, and wherein the composition includes from about 0.10 to 0.60% $Y_2O_3$.

22. A glass comprising from about 0.10 to 0.60% by weight $Y_2O_3$, and wherein the glass has a colorant portion comprising:

| Ingredient | wt. % |
|---|---|
| total iron: | 0.10–0.90% |
| erbium oxide: | 0.20–2.50% |
| holmium oxide: | 0.05–1.60%. |

23. Glass comprising:

| Ingredient | wt. % |
|---|---|
| yttrium oxide: | 0.10–2.0% |
| total iron: | 0.10–2.0% |
| erbium oxide: | 0.20–2.50 % |
| holmium oxide: | 0.05–1.60%. |

24. The glass of claim 23, comprising:

| Ingredient | wt .% |
|---|---|
| yttrium oxide: | 0.10–1.0% |
| total iron: | 0.10–0.90% |
| erbium oxide: | 0.30–2.10% |
| holmium oxide: | 0.10–0.60%. |

25. The glass of claim 23, wherein the glass is formed so as to have a dominant wavelength in the range of from 435 nm to 570 nm, and an excitation purity (Pe) of no greater than about 4.5%, and to be grey in color.

26. The glass of claim 23, further comprising:

| | |
|---|---|
| $SiO_2$ | 67–75% |
| $Na_2O$ | 10–20% |
| CaO | 5–15% |
| MgO | 0–5% |
| $Al_2O_3$ | 0–5% |
| $K_2O$ | 0–5% |
| BaO | 0–1%. |

27. The glass of claim 23, wherein the glass comprises at least three times as much erbium oxide as yttrium oxide.

28. Glass formed so as to have a dominant wavelength in the range of from 435 nm to 570 nm, and an excitation purity (Pe) of no greater than about 4.5%, and wherein the glass comprises 67 to 75% $SiO_2$, 10 to 20% $Na_2O$, 5 to 15% CaO, 0.10 to 2.0% yttrium oxide, and a colorant portion of the glass comprises iron oxide and at least two different lanthanide oxides, where a sum total of all of the lanthanide oxides plus yttrium oxide in the glass is from 1.0 to 5.0%, by weight.

29. The glass of claim 28, wherein the glass comprises at least three times as much erbium oxide as yttrium oxide.

30. The glass of claim 28, wherein the glass has a visible transmission (Lta) of at least 70%.

* * * * *